(12) United States Patent
Prasad et al.

(10) Patent No.: US 8,221,799 B2
(45) Date of Patent: *Jul. 17, 2012

(54) MULTIPLE ANTIOXIDANT OPTIMAL HEALTH/VETERANS ULTIMATE COMPLETE FORMULATIONS

(75) Inventors: Kedar N. Prasad, Novato, CA (US); Gerald M. Haase, Greenwood Village, CO (US); William C. Cole, Novato, CA (US)

(73) Assignee: Premier Micronutrient Corporation, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/671,317

(22) Filed: Feb. 5, 2007

(65) Prior Publication Data

US 2007/0184153 A1 Aug. 9, 2007

Related U.S. Application Data

(60) Provisional application No. 60/765,445, filed on Feb. 3, 2006.

(51) Int. Cl.
| | |
|---|---|
| *A61K 31/714* | (2006.01) |
| *A61K 31/498* | (2006.01) |
| *A61K 31/525* | (2006.01) |
| *A61K 31/455* | (2006.01) |
| *A61K 31/55* | (2006.01) |
| *A61K 31/355* | (2006.01) |
| *A61K 31/385* | (2006.01) |

(52) U.S. Cl. ........ 424/702; 514/168; 514/184; 514/250; 514/251; 514/356; 514/393; 514/440; 514/458; 514/52; 514/574; 514/725; 514/350

(58) Field of Classification Search .................. None
See application file for complete search history.

(56) References Cited

U.S. PATENT DOCUMENTS

| | | | | |
|---|---|---|---|---|
| 5,976,568 | A * | 11/1999 | Riley | 424/451 |
| 6,495,177 | B1 * | 12/2002 | deVries et al. | 426/72 |
| 6,572,899 | B1 * | 6/2003 | Gorsek | 424/732 |
| 6,733,797 | B1 * | 5/2004 | Summers | 424/728 |
| 6,845,777 | B2 * | 1/2005 | Pera | 131/270 |
| 6,849,613 | B2 * | 2/2005 | Prasad et al. | 514/52 |
| 2003/0147996 | A1 * | 8/2003 | Prasad et al. | 426/74 |
| 2004/0001817 | A1 * | 1/2004 | Giampapa | 424/94.1 |

* cited by examiner

*Primary Examiner* — Brian-Yong S Kwon
(74) *Attorney, Agent, or Firm* — Dan DeLa Rosa

(57) ABSTRACT

The invention is directed to a method for administering antioxidant micronutrient formulations comprising multiple dietary and endogenous antioxidants, B-vitamins, vitamin D and minerals at appropriate dosages and dose schedules particularly chosen to produce long-term 'optimal health' effects in individuals of various age groups and occupations, with particular emphasis on reducing and/or eliminating acute and/or long term effects of environmental and physical stressors and toxic chemicals to which current Operating Forces and veterans of military service are or have been exposed.

2 Claims, No Drawings

MULTIPLE ANTIOXIDANT OPTIMAL HEALTH/VETERANS ULTIMATE COMPLETE FORMULATIONS

CROSS-REFERENCE TO RELATED APPLICATIONS

This application claims the priority of Provisional Application No. 60/765,445 filed Feb. 3, 2006, the contents of which are specifically incorporated by reference herein.

FIELD OF THE INVENTION

The invention relates to methods and formulations including both dietary and endogenous antioxidants and glutathione-elevating agents adapted for optimizing the health of humans according to their age and/or occupation. One specific (but not the only) occupation to which particular attention has been paid in the development of the present methods/formulations is an individual's military status, i.e., whether he/she is presently a member of an Operating Force, e.g., army, navy, air force, or is a veteran of past military service.

BACKGROUND OF THE INVENTION

Exposure to diverse agents, such as ionizing radiation, excessive use of oxygen during strenuous physical activities, exhaust fumes, solvents and dust particles produces excessive amounts of free radicals. The extent of production of these free radicals depends, at least in part, upon the dose and type of the agents to which one is exposed. Free radicals are known to cause damage to various organs. Damaged organs initiate inflammatory reactions, the products of which (such as pro-inflammatory cytokines, reactive oxygen species, adhesion molecules, complement proteins and prostaglandin E2) are very injurious to the cells. Taken together, the condition of excess free radicals and the damage caused thereby is often referred to as, "oxidative stress".

It is well documented that increased oxidative stress and acute or chronic inflammation are major etiological factors in the initiation and/or the progression of various diseases, such as diabetes, heart disease, Alzheimer's disease and AIDS. They have also been shown to be connected with the aging process.

The present invention is, therefore, based on the finding that antioxidants at appropriate dosages and an appropriate dose schedule can neutralize free radicals, as well as reduce inflammation; therefore, they can be helpful in ameliorating a variety of adverse health conditions, as well as against exposure to several injurious agents.

Some unpublished studies on the role of antioxidants in reducing the risk of human diseases have utilized single antioxidants, primarily vitamin E or beta-carotene in high-risk populations such as heavy cigarette smokers. The results demonstrated that the risk of lung cancer and the markers of heart disease actually increased. These results could have been predicted, however, prior to the commencement of these experimental studies. This is due to the well-established fact that the individual antioxidants, when oxidized, act as free radicals. Heavy cigarette smokers have a high internal oxidative environment; therefore, beta-carotene or vitamin E will be oxidized in this environment and will act as a pro-oxidant, rather than as an antioxidant. It has been found, however that the same vitamin, when present in a multiple vitamin preparation, will not be oxidized under the same environmental conditions, because other antioxidants will act to reduce its oxidation effect. There are no data, moreover, which show that beta-carotene or vitamin E, when present in a multiple vitamin preparation containing dietary and endogenous antioxidants, produced any adverse effects on humans.

Currently, i.e., in the period prior to the development of the present invention, the appropriate combination(s) and dosages of antioxidants offering the greatest benefit to human health are not well established. Nevertheless, increasing numbers of people are taking some form of supplement in the hope that it will serve to optimize their health. Unfortunately, at present, they rely for advice upon health-related magazines, books, advertising, radio and television reports and/or vitamin store salespeople. As a result, most people consume these nutrients without any scientific rationale. Furthermore, the majority of vitamin/mineral preparations have not given adequate attention to the dose, type and chemical form of the antioxidants they ingest, or with regard to appropriate minerals and other micronutrients typically found in admixtures of antioxidant formulations.

One particular, but by no means the only, class of individuals displaying a demonstrated need for supplementing their diet with appropriate antioxidants and micronutrients, includes individuals who are veterans of military service. Such individuals are prone to long-term adverse effects of environmental and physical stressors, and toxic chemicals, typically encountered during training and/or during combat operations.

There has thus been a long-felt need by healthy individuals of both sexes from a variety of age groups for a nutritional supplement engineered to provide optimal health, taking into account their age and sex, as well as by military veterans seeking to undo acute and/or chronic damage produced by free radicals and products of inflammatory reactions that are generated by the environmental and physical stressors, and toxic chemicals to which such individuals are routinely exposed. The methods and formulations according to the present invention have thus been designed with these requirements in mind.

SUMMARY OF THE INVENTION

It is, therefore, an object of the present invention to provide formulations comprised of a unique combination of micronutrients, including both dietary and endogenous antioxidants and glutathione-elevating agents, which serve to reduce oxidative damage in individuals of various age groups (i.e., up to 35 yrs., 35-50 yrs. And 50+ yrs.) and military status, caused due to oxidative stress and inflammation, as well as to enhance immune system function.

The invention thus provides a method for administering formulations comprising certain multiple dietary antioxidants and their derivatives (vitamin A, vitamin C, alpha-tocopheryl acetate, alpha-tocopheryl succinate and selenium as selenomethionine) and endogenous antioxidants (alpha-lipoic acid, coenzyme Q10 and a glutathione-elevating agent, n-acetylcysteine), B vitamins, vitamin D and certain minerals, without containing any iron, copper or manganese, at appropriate doses and dose schedules to reduce acute and long-term adverse effects of oxidative stress and inflammation and to enhance immune system function.

DETAILED DESCRIPTION OF EMBODIMENTS OF THE INVENTION

In one embodiment, the inventors recommend administration to individuals who are not current members of an Operating Force or who are otherwise veterans of military service, up to the age of thirty-five (35) years, of their proprietary formulation available under the trademark SEVAK®, which is commercially available from Premier Micronutrients Corporation, the owner of this application. SEVAK® is comprised of the following components in the following amounts:

| | |
|---|---|
| Vitamin A (palmitate) | 5,000 I.U. |
| Beta-carotene (from natural *D. salina*) | 15 mg |
| Vitamin D-3 (cholecalciferol) | 400 I.U. |
| Natural source Vitamin E | |
| (d-alpha tocopherol) | 100 I.U. |
| (d-alpha tocopheryl acid succinate) | 100 I.U. |
| Buffered Vitamin C (calcium ascorbate) | 500 mg |
| Thiamine mononitrate | 4 mg |
| Riboflavin | 5 mg |
| Niacinamide ascorbate | 30 mg |
| d-calcium pantothenate | 10 mg |
| Pyridoxine hydrochloride | 5 mg |
| Cyanocobalamin | 10 mcg |
| Folic Acid (Folacin) | 800 mcg |
| D-Biotin | 200 mcg |
| Selenium (l-seleno-methionine) | 100 mcg |
| Chromium picolinate | 50 mcg |
| Zinc Glycinate | 15 mg |
| Calcium citrate | 250 mg |
| Magnesium citrate | 125 mg |

In another embodiment, the formulation according to the invention is particularly adapted to produce an 'optimal health' effect in individuals in the 36-50 age group. The composition of this 'Optimal Health 36-50' formulation comprises both dietary and endogenous micronutrients. For the sake of clarity, the dietary and endogenous constituents are listed separately below, although in practice, all of the ingredients of the formulation are provided in admixture with one another and thus are administered together in the form of a combination or mixture.

The dietary components include:

| | |
|---|---|
| Vitamin A (Palmitate) | 3000-5000 IU |
| Natural Vitamin E | 100-800 IU |
| (d-alpha Tocopheryl Succinate - 50-600 IU) | |
| (d-alpha Tocopheryl Acetate - 50-200 IU) | |
| Vitamin C (Calcium Ascorbate*) | 100-4000 mg |
| (*22 mg of Vitamin C is provided by Niacinamide Ascorbate) | |
| Vitamin $D_3$ (Cholecalciferol) | 200-600 IU |
| Vitamin $B_1$ (Thiamine Mononitrate) | 1-10 mg |
| Vitamin $B_2$ (Riboflavin) | 1-20 mg |
| Vitamin $B_3$ (Niacinamide Ascorbate*) | 10-60 mg |
| Vitamin $B_6$ (Pyridoxine Hydrochloride) | 1-10 mg |
| Folic Acid | 200-2000 mcg |
| Vitamin $B_{12}$ (Cyanocobalamln) | 5-30 mcg |
| Biotin | 100-1600 mcg |
| Pantothenic Acid (as D-Calcium Pantothenate) | 5-30 mg |
| Calcium Citrate | 100-500 mg |
| Magnesium Citrate | 50-250 mg |
| Zinc Glycinate | 10-60 mg |
| Selenium (Seleno-L-Methionine) | 50-250 mcg |
| Chromium (as Chromium Picolinate) | 25-250 mcg |

As indicated above, the so-called Optimal Health 36-50 formulation according to the invention additionally includes a collection of endogenous micronutrients. These materials are identified and the amounts present are as set forth below:

| | |
|---|---|
| N-Acetyl Cysteine (NAC) | 100-500 mg |
| Coenzyme $Q_{10}$ | 10-300 mg |
| R-alpha Lipoic Acid | 25-250 mg |
| L-Carnitine | 50-500 mg |
| Natural Mixed Carotenoids | 5-60 mg |

In another, more specific embodiment of the Optimal Health 36-50 formulation, the composition is comprised of:

| | |
|---|---|
| Vitamin A (Palmitate) | 5000 IU |
| Natural Vitamin E | 400 IU |
| (d-alpha Tocopheryl Succinate - 300 IU) | |
| (d-alpha Tocopheryl Acetate - 100 IU) | |
| Vitamin C (Calcium Ascorbate*) | 1500 mg |
| (*22 mg of Vitamin C is provided by Niacinamide Ascorbate) | |
| Vitamin $D_3$ (Cholecalciferol) | 400 IU |
| Vitamin $B_1$ (Thiamine Mononitrate) | 4 mg |
| Vitamin $B_2$ (Riboflavin) | 5 mg |
| Vitamin $B_3$ (Niacinamide Ascorbate*) | 30 mg |
| Vitamin $B_6$ (Pyridoxine Hydrochloride) | 5 mg |
| Folic Acid | 800 mcg |
| Vitamin $B_{12}$ (Cyanocobalamln) | 10 mcg |
| Biotin | 200 mcg |
| Pantothenic Acid (D-Calcium Pantothenate) | 10 mg |
| Calcium Citrate | 225 mg |
| Magnesium Citrate | 125 mg |
| Zinc Glycinate | 15 mg |
| Selenium (Seleno-L-Methionine) | 100 mcg |
| Chromium (as Chromium Picolinate) | 50 mcg |
| N-Acetyl Cysteine (NAC) | 250 mg |
| Coenzyme $Q_{10}$ | 45 mg |
| R-alpha Lipoic Acid | 45 mg |
| L-Carnitine | 100 mg |
| Natural Mixed Carotenoids | 15 mg |

In a further embodiment, the formulation according to the invention is adapted for administration to those of age 51 and over, who are not members of an Operating Force or otherwise veterans of military service. As in the case of the Optimal Health 36-50 formulation(s) described above, the 'Optimal Health 51+' compositions are comprised of both dietary and endogenous micronutrients. When viewed in its broadest sense, i.e., when the possible ranges of all of the various components of the composition are taken into account, the components of the optimal health 51+ composition overlaps with those of the optimal health 36-50 composition described above. The optimal health 51+ formulation is thus comprised as follows:

| | |
|---|---|
| Dietary Micronutrients | |
| Vitamin A (Palmitate) | 3000-5000 IU |
| Natural Vitamin E | 100-800 IU |
| (d-alpha Tocopheryl Succinate - 50-600 IU) | |
| (d-alpha Tocopheryl Acetate - 50-200 IU) | |
| Vitamin C (Calcium Ascorbate*) | 100-4000 mg |
| (*22 mg of Vitamin C is provided by Niacinamide Ascorbate) | |
| Vitamin $D_3$ (Cholecalciferol) | 200-600 IU |
| Vitamin $B_1$ (Thiamine Mononitrate) | 1-10 mg |
| Vitamin $B_2$ (Riboflavin) | 1-20 mg |
| Vitamin $B_3$ (Niacinamide Ascorbate*) | 10-60 mg |
| Vitamin $B_6$ (Pyridoxine Hydrochloride) | 1-10 mg |
| Folic Acid | 200-2000 mcg |
| Vitamin $B_{12}$ (Cyanocobalamln) | 5-30 mcg |
| Biotin | 100-1600 mcg |
| Pantothenic Acid (as D-Calcium Pantothenate) | 5-30 mg |
| Calcium Citrate | 100-500 mg |
| Magnesium Citrate | 50-250 mg |
| Zinc Glycinate | 10-60 mg |

-continued

| | |
|---|---|
| Selenium (Seleno-L-Methionine) | 50-250 mcg |
| Chromium (as Chromium Picolinate) | 25-250 mcg |
| Endogenous Micronutrients | |
| N-Acetyl Cysteine (NAC) | 100-500 mg |
| Coenzyme $Q_{10}$ | 10-300 mg |
| R-alpha Lipoic Acid | 25-250 mg |
| L-Carnitine | 50-500 mg |
| Natural Mixed Carotenoids | 5-60 mg |

In a further, more specific embodiment of the optimal health 51+ formulation according to the invention, the amounts incorporated of some of the various components are modified to further take into account the age level of one to whom the formulation is to be administered. In the indicated embodiment, the formulation is comprised as follows:

| | |
|---|---|
| Dietary Micronutrients | |
| Vitamin A (Palmitate) | 5000 IU |
| Natural Vitamin E | 400 IU |
| (d-alpha Tocopheryl Succinate - 300 IU) | |
| (d-alpha Tocopheryl Acetate - 100 IU) | |
| Vitamin C (Calcium Ascorbate*) | 1500 mg |
| (*22 mg of Vitamin C is provided by Niacinamide Ascorbate) | |
| Vitamin $D_3$ (Cholecalciferol) | 400 IU |
| Vitamin $B_1$ (Thiamine Mononitrate) | 4 mg |
| Vitamin $B_2$ (Riboflavin) | 5 mg |
| Vitamin $B_3$ (Niacinamide Ascorbate*) | 30 mg |
| Vitamin $B_6$ (Pyridoxine Hydrochloride) | 5 mg |
| Folic Acid | 800 mcg |
| Vitamin $B_{12}$ (Cyanocobalamln) | 10 mcg |
| Biotin | 200 mcg |
| Pantothenic Acid (D-Calcium Pantothenate) | 10 mg |
| Calcium Citrate | 250 mg |
| Magnesium Citrate | 125 mg |
| Zinc Glycinate | 15 mg |
| Selenium (Seleno-L-Methionine) | 100 mcg |
| Chromium (as Chromium Picolinate) | 50 mcg |
| Endogenous Micronutrients | |
| N-Acetyl Cysteine (NAC) | 300 mg |
| Coenzyme $Q_{10}$ | 60 mg |
| R-alpha Lipoic Acid | 60 mg |
| L-Carnitine | 150 mg |
| Natural Mixed Carotenoids | 15 mg |

In another embodiment of the invention, the micronutrient formulation has been adapted for use by veterans of military service. Such individuals are typically exposed to extreme environmental conditions including heat, cold, dehydration, dust particles, high repeated noise waves, physical exhaustion and toxic solvents such as diesel fuel and various hydrocarbons during training and/or while on active service. The above-identified agents are known to generate increased amounts of free radicals derived from oxygen and nitrogen that can increase oxidative stress in the case of individuals so exposed, leading to adverse health effects such as increased frequency of colds, physical exhaustion and overall not feeling well.

In combat, operating forces are additionally exposed to blast effects generated by explosive devices such as bombs, mortars, artillery shells, missiles, anti-tank weapons and land mines. Blast exposure is one of the major cause of injury to those actively serving in the Operating Forces, often producing residual effects for many years, in some cases until the death of the individual, in veterans of such service. Blast exposures cause damage by generating excessive amounts of inorganic and organic free radicals and by the products of inflammatory reactions that include pro-inflammatory cytokines, prostaglandins and other toxic chemicals. Free radicals, reactive oxygen species and pro-inflammatory cytokines can produce acute adverse health effects and can also increase the risks of chronic disease such as cancer, cataract, heart disease and neurological diseases.

The same can be said about exposure to chemical warfare agents that include major classes of chemicals, such as mustard agents (sulfur mustards and nitrogen mustards), nerve agents (Tabum, Sarin, Soman, GF and VX) ricin and chlorine gas. These chemical toxins also produce excessive amounts of different types of free radicals and acute inflammatory reactions. For these reasons, therefore, the invention further includes various embodiments engineered and/or otherwise adapted to relieve one or more of the above-described symptoms as are often found in veterans of military service.

In one embodiment, this 'Veterans Ultimate Complete' formulation is comprised of the same components in the same ranges as the 'optimal health 36-50' and the 'optimal health 51+' formulations described above, namely:

| | |
|---|---|
| Dietary Micronutrients | |
| Vitamin A (Palmitate) | 3000-5000 IU |
| Natural Vitamin E | 100-800 IU |
| (d-alpha Tocopheryl Succinate - 50-600 IU) | |
| (d-alpha Tocopheryl Acetate - 50-200 IU) | |
| Vitamin C (Calcium Ascorbate*) | 100-4000 mg |
| (*22 mg of Vitamin C is provided by Niacinamide Ascorbate) | |
| Vitamin $D_3$ (Cholecalciferol) | 200-600 IU |
| Vitamin $B_1$ (Thiamine Mononitrate) | 1-10 mg |
| Vitamin $B_2$ (Riboflavin) | 1-20 mg |
| Vitamin $B_3$ (Niacinamide Ascorbate*) | 10-60 mg |
| Vitamin $B_6$ (Pyridoxine Hydrochloride) | 1-10 mg |
| Folic Acid | 200-2000 mcg |
| Vitamin $B_{12}$ (Cyanocobalamln) | 5-30 mcg |
| Biotin | 100-1600 mcg |
| Pantothenic Acid (as D-Calcium Pantothenate) | 5-30 mg |
| Calcium Citrate | 100-500 mg |
| Magnesium Citrate | 50-250 mg |
| Zinc Glycinate | 10-60 mg |
| Selenium (Seleno-L-Methionine) | 50-250 mcg |
| Chromium (as Chromium Picolinate) | 25-250 mcg |
| Endogenous Micronutrients | |
| N-Acetyl Cysteine (NAC) | 100-500 mg |
| Coenzyme $Q_{10}$ | 10-300 mg |
| R-alpha Lipoic Acid | 25-250 mg |
| L-Carnitine | 50-500 mg |
| Natural Mixed Carotenoids | 5-60 mg |

In a further, more specific embodiment of the veterans ultimate complete composition according to the invention, the amounts incorporated of some of the various components are modified to further take into account the variety and extent of stressors to which operating force veterans have typically been exposed to. The formulation is, thus, comprised as follows:

| | |
|---|---|
| Dietary Micronutrients | |
| Vitamin A (Palmitate) | 5000 IU |
| Natural Vitamin E | 400 IU |
| (d-alpha Tocopheryl Succinate - 300 IU) | |
| (d-alpha Tocopheryl Acetate - 100 IU) | |
| Vitamin C (Calcium Ascorbate*) | 1500 mg |
| (*22 mg of Vitamin C is provided by Niacinamide Ascorbate) | |
| Vitamin $D_3$ (Cholecalciferol) | 400 IU |

| -continued | |
|---|---|
| Vitamin B₁ (Thiamine Mononitrate) | 4 mg |
| Vitamin B₂ (Riboflavin) | 5 mg |
| Vitamin B₃ (Niacinamide Ascorbate*) | 30 mg |
| Vitamin B₆ (Pyridoxine Hydrochloride) | 5 mg |
| Folic Acid | 800 mcg |
| Vitamin B₁₂ (Cyanocobalamln) | 10 mcg |
| Biotin | 200 mcg |
| Pantothenic Acid (as D-Calcium Pantothenate) | 10 mg |
| Calcium Citrate | 250 mg |
| Magnesium Citrate | 125 mg |
| Zinc Glycinate | 15 mg |
| Selenium (Seleno-L-Methionine) | 100 mcg |
| Chromium (as Chromium Picolinate) | 50 mcg |
| Endogenous Micronutrients | |
| N-Acetyl Cysteine (NAC) | 300 mg |
| Coenzyme Q₁₀ | 60 mg |
| R-alpha Lipoic Acid | 60 mg |
| L-Carnitine | 150 mg |
| Natural Mixed Carotenoids | 15 mg |

The dosages set forth in the formulations described above are daily dosages. In a particular embodiment of the invention, the micronutrient formulation according to the invention may be packaged in a capsule (e.g., a gelatin capsule or a softsule) for administration to one having a need for the formulation. It may be administered two or more times a day for a total dosage of six (6) size #00 capsules. These administrations may be timed to coincide with the individual's morning, afternoon and/or evening meals.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An antioxidant micronutrient formulation consisting of:

| | |
|---|---|
| Vitamin A (Palmitate) | 3000-5000 IU |
| Natural Vitamin E | |
| (d-alpha Tocopheryl Succinate - 50-600 IU) | |
| (d-alpha Tocopheryl Acetate - 50-200 IU) | |
| Vitamin C (Calcium Ascorbate*) | 100-4000 mg |
| (*22 mg of Vitamin C is provided by Niacinamide Ascorbate) | |
| Vitamin D-3 (Cholecalciferol) | 200-600 IU |
| Vitamin B-1 (Thiamine Mononitrate) | 1-10 mg |
| Vitamin B-2 (Riboflavin) | 1-20 mg |
| Vitamin B-3 (Niacinamide Ascorbate*) | 10-60 mg |
| Vitamin B-6 (Pyridoxine Hydrochloride) | 1-10 mg |
| Folic Acid | 200-2000 mcg |
| Vitamin B-12 (Cyanocobalamin) | 5-30 mcg |
| Biotin | 100-1600 mcg |
| Pantothenic Acid (as D-Calcium Pantothenate) | 5-30 mg |
| Calcium Citrate | 100-500 mg |
| Magnesium Citrate | 50-250 mg |
| Zinc Glycinate | 10-60 mg |
| Selenium (Seleno-L-Methionine) | 50-250 mcg |
| Chromium (as Chromium Picolinate) | 25-250 mcg |
| N-Acetyl Cysteine (NAC) | 100-500 mg |
| Coenzyme Q10 | 10-300 mg |
| R-alpha Lipoic Acid | 25-250 mg |
| L-Carnitine | 50-500 mg | wherein said formulation is used by military personnel and veterans.

2. The formulation of claim 1 wherein said formulation is consumed by a user at least twice per day.

* * * * *